Patented Jan. 12, 1943

2,308,427

UNITED STATES PATENT OFFICE 2,308,427

CUTTING OIL COMPOSITION

Theodore G. Roehner, Malverne, and Louis H. Sudholz, Brooklyn, N. Y., assignors to Socony-Vacuum Oil Company, Incorporated, New York, N. Y., a corporation of New York No Drawing. Application October 16, 1940, Serial No. 361,384

10 Claims. (Cl. 252—45)

This invention relates to the making of lubricant oils capable of use under conditions requiring extreme pressure lubrication, and particularly to the provision of a novel and useful new class of sulphurized ingredients for raising the film lubricating strength of lubricants used under combined high pressure and high rubbing speeds, and to the general class of oils known as cutting oils.

Such oils are useful in the lubrication of moving parts, such as automotive hypoid gears; as drawing oils; and as cutting oils; both in the form of non-aqueous oils and aqueous dispersions of oils.

The characterizing ingredient for such oils is usually either a sulphurized mineral oil or a sulphurized fatty oil of animal or vegetable origin. This invention is concerned with materials of the latter class.

Among the fatty oils commonly used for sulphurization, there may be mentioned sperm oil, soya bean oil, fish oil, corn oil, and the like. Palm oils have never been considered to be suitable materials for such uses.

This invention has for its object the provision of novel and useful sulphurized materials for such uses; the provision of such materials further activated by the addition of phosphorus, and the provisions of lubricants of the several classes noted which contain such characterizing ingredients.

The invention is based upon the discovery that palm oil of a certain type, known as Vinifera palm oil, more accurately defined hereinafter, in view of its peculiar composition, is especially suitable for sulphurization and for combined sulphurization and phosphorization to give useful characterizing ingredients for extreme pressure lubrication.

The Vinifera palm oil, or "oil of bamboo" as it is known at its point of origin, is obtained from the Laurentii and Gentiliana raphia palm tree which grows in enormous forests in the marsh land of the lower Congo in Africa. It should not be confused with the Elaesis guineensis palm which is the source of ordinary palm oil.

The fruit of the raphia palm grows in the form of enormous grapelike bunches and shows a layer of orange-yellow pulp, 2–5 mm. thick, between the shell and the kernel. This pulp is rich in oil and is the source of the "bamboo" oil. The picked fruit are piled in heaps for several days, and the fermentation which results permits the easy removal of the shell. The pulping is carried out by foot treading in a large receptacle to which water has been added. The kernels can thus be removed, and the remaining mass is separated and the oil collected.

The intact fruit of Gentiliana raphia palm contains 6.27% oil, obtainable from the pulp, while the pulp contains 31.5% oil. The fruit of the Laurentii raphia palm contains 7.52% oil, obtainable from the pulp, while the pulp contains 33.8% oil.

The analysis of these oils from the above trees shows them to be identical and they are not differentiated but referred to as "bamboo oil."

A typical analysis of Vinifera palm oil is given below:

Analysis of Vinifera palm oil

| | |
|---|---|
| Iodine value | 79.5 |
| Acid value | 11.5 |
| Percent free fatty acids (as oleic acid) | 5.4 |
| Saponification value | 198.7 |
| Unsaponifiable matter, percent | 3.9 |
| Separated fatty acids, percent | 93.1 |
| Mean molecular weight | 294.0 |
| Iodine value | 82.0 |
| Melting point, °C | 36.7 |
| Liquid fatty acids, percent | 55.5 |
| Mean molecular weight | 307.0 |
| Iodine value | 129.0 |
| Thiocyanogen value | 86.8 |
| Hexobromide value | 0.0 |
| Acetyl value | 25.0 |
| Solid fatty acids, percent | 45.4 |
| Mean molecular weight | 273.9 |
| Iodine value | 14.0 |
| Melting point, °C | 51.4 |

The above analysis may be interpreted in terms of fatty acid composition as follows:

| | Percent by weight |
|---|---|
| Oleic acid | 30.1 |
| Linoleic acid | 27.7 |
| Palmitic acid | 15.2 |
| Stearic acid | 27.0 |

However, the above specific data are given only as an example and for generally definitive purposes we give below a range within which the fatty acid composition of Vinifera palm oil may vary.

| | Percent by weight |
|---|---|
| Oleic acid | 28–33 |
| Linoleic acid | 25–30 |
| Palmitic acid | 13–17 |
| Stearic acid | 25–30 |

In computing the percentage of the above acids, the actual presence of minute quantities of other acids of a similar nature has been ignored. The data show the wide range in the character of the fatty acids from saturated acids to fatty acids with two coordinated double bonds as linoleic acids—all being present in considerable quantity. A survey of the composition of available commercial oils presently used will show that this oil possesses a distinctive composition. The outstanding value of the Vinifera palm oil lies in its peculiar composition. It is high in saturated acids and at the same time it contains an appreciable amount of linoleic acid so that the actual spread of the type of fatty acids greatly exceeds that of the common commercial oils.

It may be noted that this oil contains large amounts of both saturated and unsaturated fatty acids, and that its quite unusual properties with regard to sulphurization may be attributed thereto.

It also responds very well to treatments with $P_4S_3$ for phosphorization and the product so obtained containing both phosphorus and sulfur has outstanding properties as an EP material.

By varying the percent of sulfur and the manufacturing conditions, as is well known in the art, it is possible to produce either so-called corrosive or non-corrosive sulfurized bases.

Several batches of sulfurized Vinifera palm oil were prepared and the data on these runs are shown below.

| Run No. | Sulfur in charge | Temp. of sulfurization | Time of sulfurization | Sulfur content by analysis | Stability after chilling |
|---|---|---|---|---|---|
|  | Per cent | °F. | Hours | Per cent |  |
| 1 | 15 | 400 | 1 | 13.2 | O. K. |
| 2 | 17 | 400 | 1¼ | 12.7 | O. K. |
| 3 | 19 | 450 | 1 | 14.1 | O. K. |
| 4 | 20 | 400 | 2 | 13.9 | O. K. |
| 5 | 22 | 450 | 1 | 15.0 | (¹). |
| 6 | 10 | 380–400 | 1 | 9.24 | O. K. |

¹ Trace of separation.

Products of Runs 1 to 5 inclusive are corrosive to copper, while product of Run No. 6 is non-corrosive.

A cutting oil was prepared by blending

|  | Per cent |
|---|---|
| Sulfurized base from Run No. 1 | 6 |
| 100 sec. S. U. V. at 100° F. paraffin oil | 94 |

This product was tested for E P characteristics in the Almen pin machine and showed an O. K. load of 30,000 lbs./sq. in.

Based on the above tests, it is clear that an excellent corrosive sulfurized cutting oil base can be prepared by heating Vinifera palm oil with 12 to 25 percent sulfur at temperatures between 300 and 460° F. The corrosive base so obtained, containing from 7½ to 20 percent sulfur, may be blended with mineral oil to any sulfur content, depending upon the service expected.

It is also clear that a cutting oil base non-corrosive to copper can be prepared by sulfurizing Vinifera palm oil with 5 to 15 percent sulfur at temperatures from 270 to 400° F. This base, containing from 4½ to 13½ percent sulfur, in turn can be blended with mineral oil to any sulfur content desired, depending upon the service expected.

It may be further shown that the sulfurized Vinifera palm oil can readily be converted into a phosphorized-sulfurized base possessing exceptionally high load carrying characteristics.

A sulfurized Vinifera palm oil base was prepared by heating the oil with 10 percent sulfur at a temperature of 350 to 400° F. for one hour. The non-corrosive sulfurized base was then cooled to 280° F. At this temperature 4 percent $P_4S_3$ was added in the form of a slurry in sulfurized oil. The temperature was maintained at 280–300° F. for four hours.

When tested for stability at 0° F. for 24 hours and allowed to return to room temperature, the product proved to be of good stability.

Cutting oils were prepared as follows and tested for film strength.

O. K. load, lbs./sq. in.
Blend No. 1, 3% P and S base, 97% 100 sec. paraffin oil_____ 30,000+
Blend No. 2, 1% P and S base, 99% 100 sec. paraffin oil_____ 30,000+

In both cases the Almen pins indicated only very slight wear and darkening.

The extent of the extreme pressure characteristics imparted to the sulfurized Vinifera palm oil by the reaction with $P_4S_3$, is demonstrated by comparing the above Almen pin data with the following data on the straight sulfurized product not reacted with $P_4S_3$ and blended with the same Paraffin oil.

O. K. load, lbs./sq. in.
Blend No. 3, 3% sulfurized Vinifera palm oil containing 10% sulfur, 97% 100 sec. mineral oil _____ 22,000
Blend No. 4, 1% sulfurized Vinifera palm oil containing 10% sulfur, 99% 100 sec. mineral oil _____ 5,000

In the class of straight sulphurized Vinifera palm oil bases the concentration of sulphur may usefully range from about 0.5% to about 15% by weight, the higher concentrations, that is from about 10% of sulphur to about 15% of sulphur by weight being more applicable to most uses.

In the class of sulphur-phosphorus Vinifera palm oil bases, the concentrations may usefully range from minimum of about 0.3% phosphorus and 0.5% sulphur by weight, to maxima of about 7.0% phosphorus and 15% sulphur by weight.

In order to obtain products of the above phosphorus and sulphur concentrations, the sulphurized Vinifera palm oil base should be reacted with $P_4S_3$ (or with elemental sulphur and phosphorus in the proportions of $P_4S_3$), in the following proportions:

|  | Per cent |
|---|---|
| $P_4S_3$ | 0.5 to 10.0 |
| Sulphurized Vinifera palm oil containing | 99.5 to 90.0 |
| Sulphur | 5 to 15 |

Extreme pressure lubricants, such as hypoid lubricants, drawing oils, and cutting oils of the non-soluble type may be prepared by blending either of these types of bases with mineral oil lubricating fractions of proper viscosity in proportions to give sulphur content, or sulphur and phosphorus contents, appropriate to the service for which the oil is made.

Soluble cutting oils may be made, as is usual in the art, by blending the bases, in appropriate amounts, with light lubricating oils, such as oils of 100 seconds viscosity (Saybolt) at 100° F., and adding thereto an emulsifier, such as a soap of triethanolamine or a soap of a mineral oil sulphonic acid.

We claim:

1. A composition of matter, capable of conferring enhanced extreme pressure lubricating character upon a mineral oil lubricant, comprising sulphurized Vinifera palm oil.

2. A composition of matter, capable of conferring enhanced extreme pressure lubricating character upon a mineral oil lubricant, comprising sulphurized Vinifera palm oil which has additionally been reacted with phosphorus.

3. A composition of matter, capable of conferring enhanced extreme pressure lubricating character upon a mineral oil lubricant comprising sulphurized Vinifera palm oil containing from about 0.5% to about 15.0% by weight of sulphur.

4. A composition of matter, capable of conferring enhanced extreme pressure lubricating character upon a mineral oil lubricant, comprising sulphurized-phosphorized Vinifera palm oil containing sulphur and phosphorus in proportions from about 0.3% phosphorus and 0.5% sulphur to about 7.0% phosphorus and 15% sulphur by weight.

5. A lubricant capable of enhanced utility under conditions of extreme pressure lubrication comprising a viscous mineral oil fraction and sulphurized Vinifera palm oil.

6. A lubricant capable of enhanced utility under conditions of extreme pressure lubrication comprising a viscous mineral oil fraction and sulphurized Vinifera palm oil which has been additionally reacted with phosphorus.

7. A lubricant oil composition comprising a viscous mineral oil lubricant fraction and sulphurized Vinifera palm oil containing from about 0.5% to about 15% by weight of sulphur.

8. A lubricant composition comprising a viscous mineral oil lubricant fraction and sulphurized-phosphorized Vinifera palm oil containing sulphur and phosphorus in proportions from about 0.3% phosphorus and 0.5% sulphur to about 7% phosphorus and 15% sulphur by weight.

9. A soluble cutting oil comprising a light mineral lubricating oil, an emulsifier, and sulphurized Vinifera palm oil.

10. A soluble cutting oil comprising a light mineral lubricating oil, an emulsifier, and sulphurized Vinifera palm oil which has been additionally reacted with phosphorus.

THEODORE G. ROEHNER.
LOUIS H. SUDHOLZ.